Patented Jan. 5, 1937

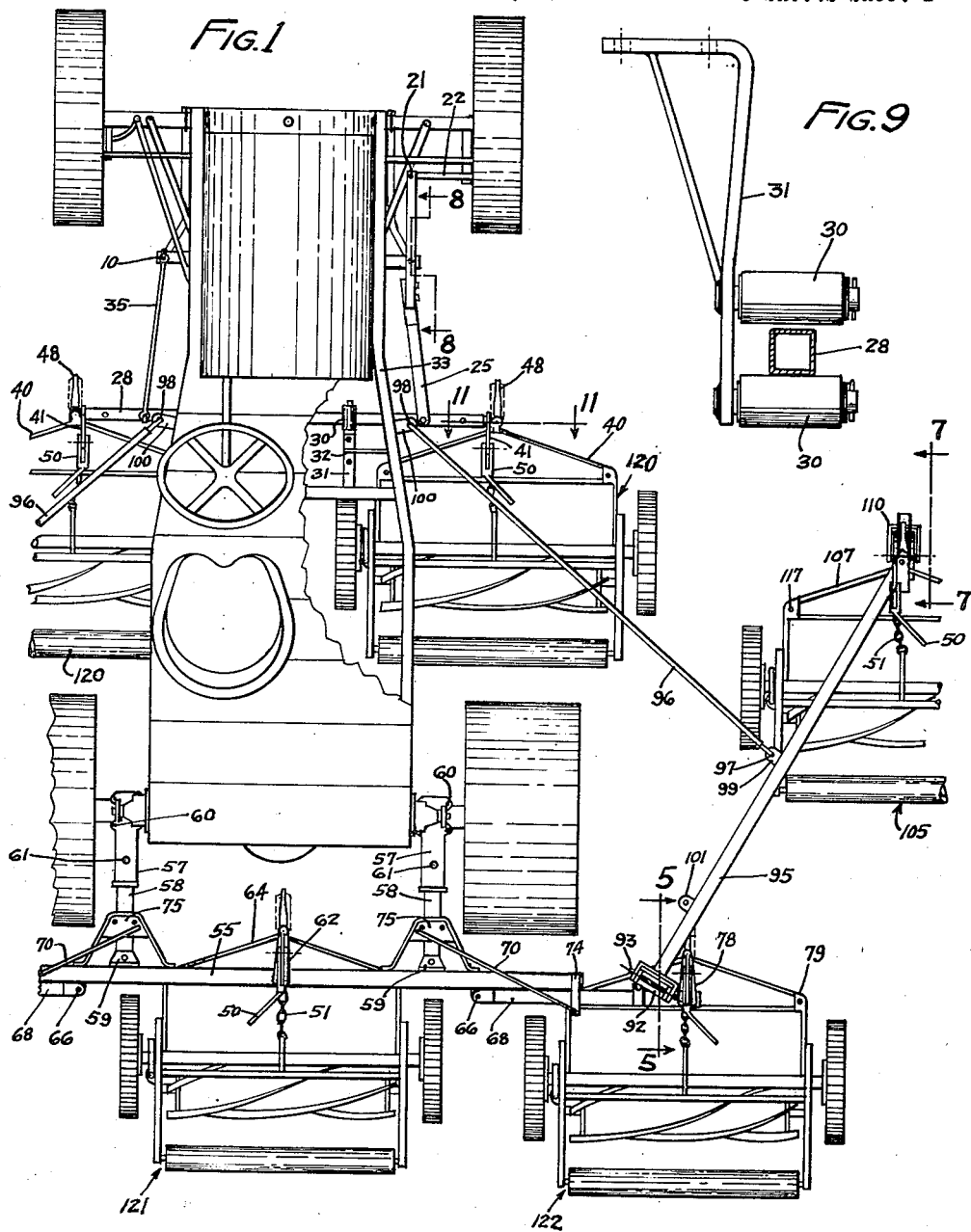

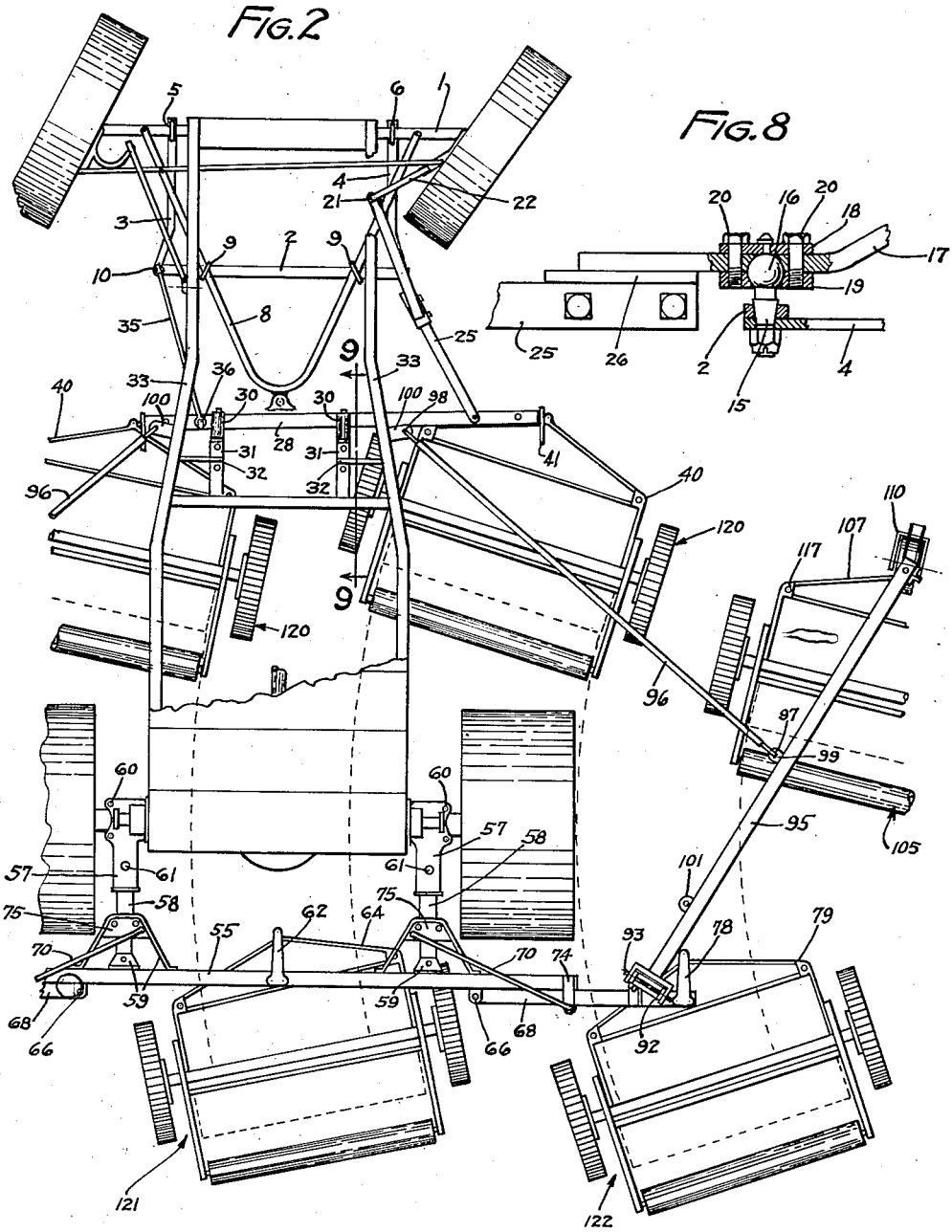

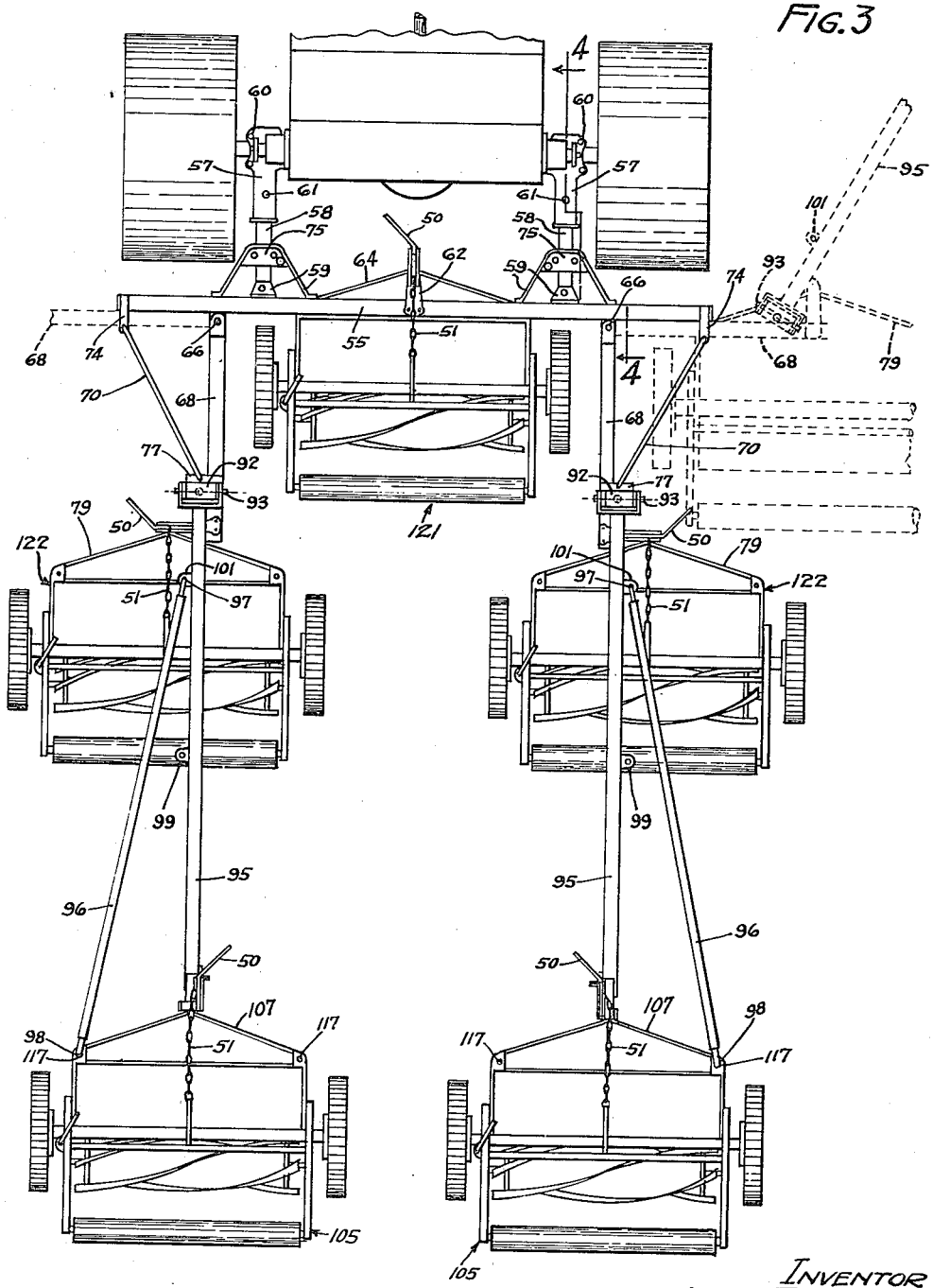

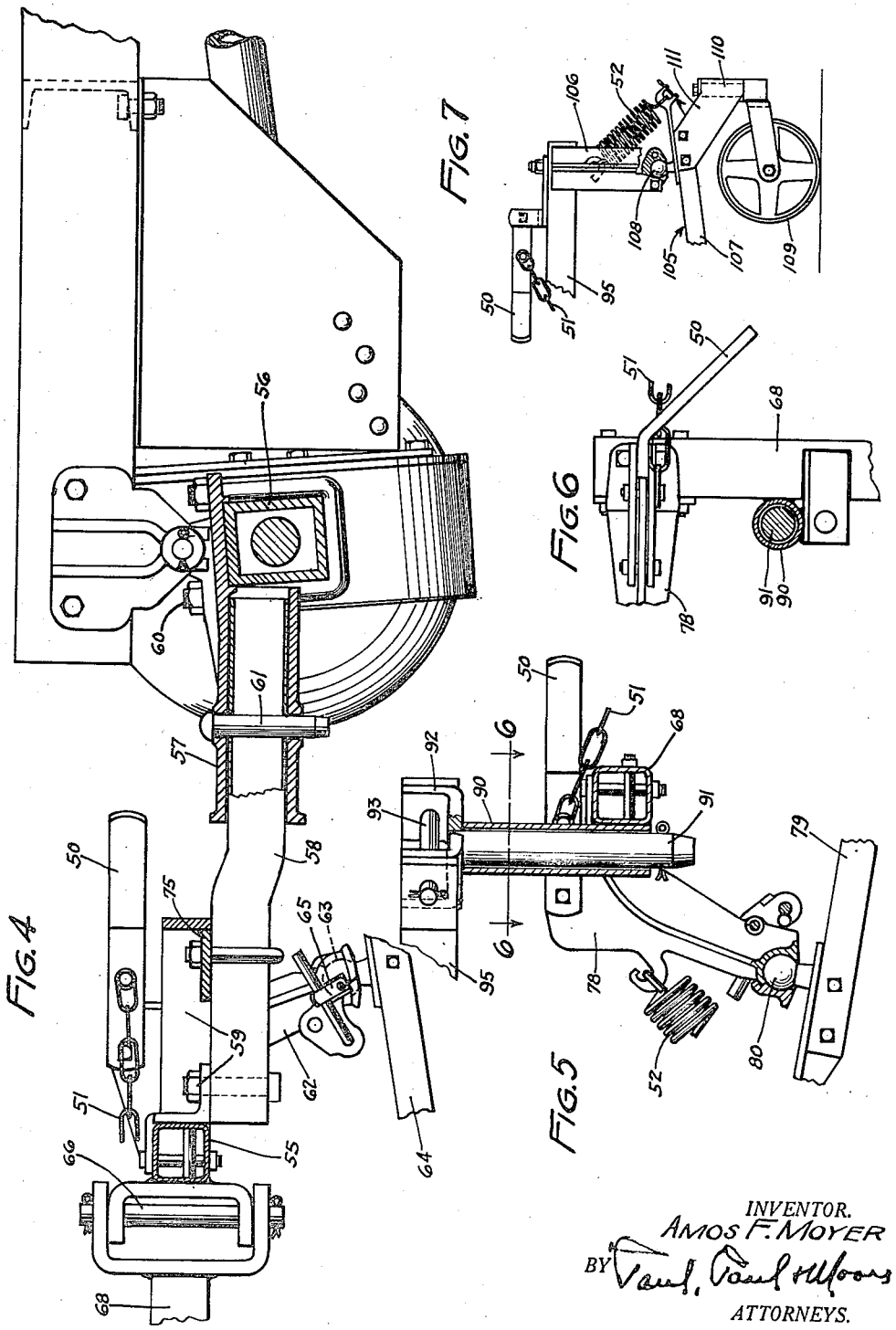

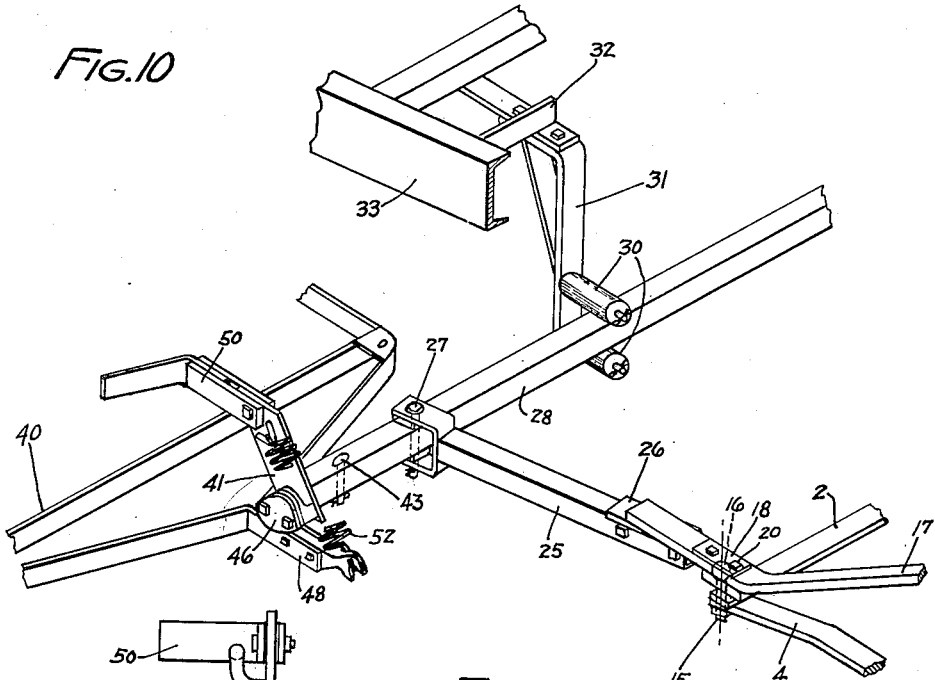
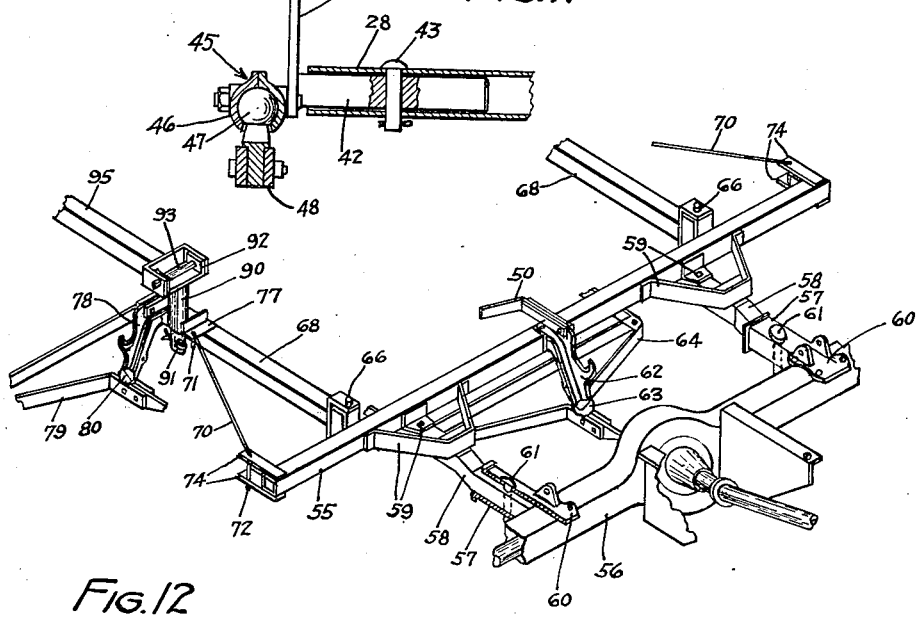

2,067,158

UNITED STATES PATENT OFFICE 2,067,158

POWER GANG LAWN MOWER

Amos F. Moyer, Minneapolis, Minn., assignor to Toro Manufacturing Company, Minneapolis, Minn., a corporation of Delaware Application May 8, 1933, Serial No. 669,818

29 Claims. (Cl. 56—7)

This invention relates to improvements in the tractor-controlled gang lawn mower art, and has as an important object, to provide a compact arrangement of transversely spaced mower units in relation to a tractor, to cut overlapping swaths which in the aggregate produce a relatively broad swath.

A feature of the invention relates to means by which certain of the mowers can, without being lifted or disconnected, be swung to a trailing position behind the tractor in a manner to so substantially reduce the transverse spacing of the units that the entire system may pass freely through gates, between trees, and along narrow roadways, etc.

Other features are: the manner of positioning the mowing units for easy observation by the driver of the tractor, so that he may readily judge and control the degree of the lap of the cuts of the outside units of the gang with the previous cut, and so that he can always see when any unit is not properly operating, whatever the reason; having all means for operatively connecting the units, supported by the tractor, so that separate gang frame supporting wheels are not required, thus reducing the weight drawn by the tractor, and also having the advantage of adding tractive power by adding the weight of the mower connections to the tractor; utilizing the tractor as an essential part of the unit spacing means in such manner that the units are relatively closely spaced in relation to the tractor, and so that they can be transversely spaced to cooperate to cut a relatively large swatch; the use of two units, one in advance of each tractor drive wheel and in the path of the wheel to cut the grass before being tracked down or matted down by the drive wheels and traction spuds thereof; the provision of means for transversely shifting, while making turns, those mower units which are arranged in advance of the tractor drive wheels to cause the swaths thereof to overlap the swaths of other mower units connected in the rear of the tractor drive wheel axle; the use of a conventional knuckle type of front axle and steering means in conjunction with the accomplishment of the shifts; to so connect and arrange each mower unit that it is individually free to swing into a naturally aligned position on turns, so that there is no skidding of the unit drive wheels and consequent tearing of the turf; to provide means to maintain the cuts of the various units in lapped and properly aligned relation on turns, and so that only a small lap in cuts is required, and so that the maximum total swath is obtained with a given number of units; to space the units which are disposed rearwardly of the rear axle of the tractor closely to said axle; and to provide means for quickly removing any or all of the units and connecting members, thus easily rendering the tractor available for other purposes, or permitting operation at will of seven or only five, or three units.

The present invention overcomes certain objections incident to the use of the conventional pull-type of gang lawn mower in which the units are towed behind a tractor, which objections are: that the mowers are entirely behind the operator where he cannot give them the desired close attention; that the tractor drive wheels pass over the uncut grass, matting the grass down beneath the traction lugs so that it is not properly cut; that the necessary lateral swinging movement between the tractor and the gang as a whole requires the mowers to be at a considerable distance behind the tractor and operator; and that the total length in the forwardly and rearwardly direction of the tractor and mower gang assumes ungainly proportions and requires a large space under cover for storage away from the weather.

As compared with the so-called push type of power gang lawn mower, certain objections are overcome by this invention, which objections are: that a long tractor frame is required for such gangs to extend forwardly over the mowers in order to allow the entire gang to swing laterally on turns without striking the tractor; that an independent and more complicated gang frame is required to extend laterally for the proper spacing of the mowers; that excessive muscular effort is required of the operator to steer the entire gang and gang frame, or that a power steering gear is required for such gangs; that passage through narrow places with even only five mowers in the gang requires folding of the outside mowers and frame sections upwardly, with hoisting means on the tractor to lift and transport the weight of these mowers; and that no feasible means are available, when using seven mowers in such gangs, for transporting the outside mowers through narrow places.

Features also include all details of construction shown and/or described.

Objects, features and advantages of the invention will be set forth in the description of the drawings forming a part of this application, and in said drawings Figure 1 is a plan view illustrating the normal arrangement of a seven unit gang of mower units, in relation to the tractor, with two of the units omitted, and only parts of two others shown;

Figure 2 is a plan view similar to Figure 1 showing the action of the units as during a change in steering direction;

Figure 3 is a plan view showing four of the seven units in trailing position, the forward portion of the tractor and two forward units having been omitted;

Figure 4 is a vertical section approximately on line 4—4 of Figure 3, and showing the swing bar in trailing position;

Figure 5 is a vertical section approximately on line 5—5 of Figure 1, illustrating the pivotal connection of the lateral mower supporting bar with the rear swing bar, and also showing the ball and socket connection of the mower frame with the swing bar-supported bracket;

Figure 6 is a plan section on line 6—6 of Figure 5 further illustrating this pivotal connection and the mower-supporting bracket;

Figure 7 is an elevation partly in section viewed from line 7—7 of Figure 1, illustrating the connections and caster wheel for one of the lateral or out-board mower units;

Figure 8 is a vertical section approximately on line 8—8 of Figure 1 showing the ball and socket pivot connection between the draft frame and the steering lever;

Figure 9 is a vertical section taken substantially on line 9—9 of Figure 2 illustrating the support for the front mower unit shift-bar;

Figure 10 is a somewhat fragmentary perspective view illustrating the detachable connection for one of the forward group of mowers, and the relations of the steering lever and steering arm to the draft frame and shift-bar;

Figure 11 is a vertical section approximately on line 11—11 of Figure 1 illustrating the detachable ball and socket joint structure for connecting one of the front mowers to the shift-bar, and the means for detachably securing the joint structure to said bar; and Figure 12 is a somewhat fragmentary perspective view illustrating the tractor-supported, mower unit-connecting structures, at the rear of the tractor.

This invention has been shown as applied to a tractor of a specific type, but of course there is no intention to be limited to the type of tractor. The drawings illustrate the arrangement of a seven unit gang, in which the units are positioned to cut overlapping swaths, and are arranged in groups. Two of the mower units are arranged between the front and rear wheels in the path of the rear traction wheels and are spaced and aligned transversely, three units are arranged rearwardly of the tractor wheels and are spaced and aligned transversely, and two units are arranged one at each opposite side of the tractor, outwardly beyond the corresponding outermost unit of the three rear units, and at a point forwardly of the rear and rearwardly of the forward group of units and aligned transversely.

Although there is no intention to limit any of the broader aspects of the invention, yet the illustrated and particular arrangement of units is also claimed. It is noted that the units are all connected in operative relation, by means which is entirely supported by the tractor, except only that the means for connecting the two outside units of the seven units are partially supported by caster wheels.

Referring first to Figures 2 and 10: There is provided means carried by the tractor and laterally shiftable thereon for correspondingly laterally shifting two mowers which are pivoted to swing in a horizontal plane. These mowers are arranged forwardly of the rear tractor wheels, and in the tread path of the wheels, and between the front and rear wheels. The arrangement of the mowers in this position in combination with other mowers behind the rear tractor wheels, is a feature of the invention, and the shifting of these mowers laterally conformably to steering direction is another feature.

To carry out the above scheme, there is centrally attached to the front axle 1 of the tractor, and to the radius rod 8, a draft frame comprising elements 2, 3 and 4. The longitudinal elements 3 and 4 are clipped to the axle respectively as at 5 and 6, and the transverse element 2 is clipped to the radius rod 8 as at 9. Element 2 is attached to element 3 by means of an eye-bolt 10, and element 4, see Figures 8 and 10, is connected to element 2 by a suitable bolt 15 which has a ball 16 at its upper end. This ball fits a socket in a shift-lever 17 and is held therein by upper and lower plates 18 and 19 secured by bolts 20 passing through the shift-lever. The shift-lever is suitably pivotally connected at one end as at 21 to the steering link 22 which is, in turn, connected by a special ball, not shown, provided on the front wheel knuckle (not shown) of the tractor. By this connection, whenever the wheels are turned the lever is rocked.

Detachably connected to the rear end of the lever 17, as at 26, and forming an extension thereof is a shift-arm 25. The rear end of the shift-arm is in turn pivotally connected, see Figure 10, as at 27 to shift bar 28 mounted for transverse adjustment between pairs of rolls 30 (see also Figure 9) mounted on brackets 31, detachably secured to brackets 32 extending inwardly from the inner side of the longitudinal frame members 33 of the tractor chassis. When steering straight ahead, the shift bar 28, see Figure 1, extends equi-distantly laterally beyond the chassis at both sides. Link 35 connects with eye-bolt 10 and with another eye-bolt 36 of the shift bar 28, as shown. By means of link 35 and shift arm 25, the shift bar 28 is held in operative position between the rollers 30.

Attached to each outer end of the shift bar 28 by means of draw bars 40 is a mower unit generally indicated at 120. Each unit is arranged to cut in advance of the corresponding traction wheel, before the grass is matted down by the wheel. Referring to Figures 10 and 11, and first to Figure 11: Shift-bar 28 has the form of a rectangular tube. Each mower unit bar 40 is detachably secured by means of a ball and socket joint to a mower hitch bracket which, in turn, is detachably secured to the tube. Each bracket comprises an upright extension plate 41 attached to a rectangular bar 42 which sockets in the end of the shift bar 28, and which is detachably held by means of a pin 43, secured by a split key, as shown. At the outer side of plate 41 is a socket structure 45 having a detachably secured outer section 46. This socket receives ball 47 suitably attached to the forward portion 48 of the draw bar 40 of the lawn mower 120. Pivoted to the extension 41 is the usual lever 50, operating chain 51 for tilting the unit about a pivot (not shown) at the rear of the draw bar, to raise the cutters, ordinarily about three inches from the ground. The usual draw bar spring 52 is provided and is engaged as shown. This spring is connected to the forward portion 48 of the draw bar. By this means, each mower unit is pivoted for universal movements and particularly for movement in a horizontal plane to assume positions like that shown in Figure 2 conformably to the direction of travel of the tractor. Means, not shown, is ordinarily provided for throwing the cutters out of gear during transportation. Each unit of the gang is provided with a lever 50, chain 51, and spring 52, so that no further reference is made to these structures.

It may be said that the mower units are entrained by the draft and shift bar 28. It will be noted that the mower units 120 which may be of any preferred type are individually free to swing into natural aligned position on turns so that there is no skidding of the unit drive wheels or consequent tearing of the turf. These units are in position for easy observation by the driver of the tractor. With the units arranged ahead of the drive wheels of the tractor, the grass is cut before being tracked down or matted down by the drive wheels and traction spuds. The connections for these units are carried entirely by the tractor, as are also the connections for certain other units in the gang.

Referring now to Figures 4 and 12, at the rear of the tractor there is arranged a cross bar 55 rigidly but detachably supported by the tractor, in this instance by the rear axle 56, by means of socket element 57 suitably bolted to the rear axle casing of the tractor, as at 60, and receiving tubular rectangular extensions 58 to each of which is bolted and braced as at 59, the cross bar 55. Pins 61 releasably secure the extensions 58 in their sockets.

Attached centrally of this cross bar 55 is a mower hitch bracket 62 to the lower end of which is connected, by means of a ball and socket joint 63, the draw bar 64 of a mowing unit generally indicated at 121. Means generally indicated at 65 is provided for quickly opening the ball and socket joint to release the ball so that the mower can be removed. The mower 121 is arranged centrally between the rear tractor wheels at the rear of said wheels and the ball and socket joint allows the trailed mower unit to adjust itself to the motions of the tractor and to inequalities of the ground.

Pivoted inwardly from each end of the bar 55 as at 66, see Figures 4 and 12, is an extension bar 68 which, during a mowing operation, is disposed as shown in Figures 1 and 2, to extend laterally beyond the end of the bar 55, and in this instance laterally beyond the outer side of the corresponding rear tractor wheel. The bar 68 is held in its operative position by means of a link 70 which has down-turned portions or hooks 71—72; see Figure 12, which shows the position of the link during a trailing period.

In Figures 1 and 2, the down-turned portion 72 is engaged through openings in spaced brackets 74 of cross bar 55 to secure the bar 68 in parallel relation with bar 55 and against rearward rotation about its pivot 66, said bar at this time lying between the brackets 74. The other down-turned portion 71 of the link 70 is inserted in an opening provided in plate 75, see also Figure 4, clipped to the element 58 which supports the cross bar 55.

Each bar 68 is thus arranged so that it can be swung rearwardly to a trailing position shown in Figures 3 and 12 and it is held in this position also by the link 70 but, in this instance, the projection 71 of the rod engages an opening in a plate 77 of bar 68. The link 70 is, therefore, used for locking the bar 68 in either of its positions. It is noted that the pin 72 is connected with the bracket 74 for both positions of the link 70.

To the outer end of each bar 68 is suitably connected by means of hitch bracket 78, and draw bar 79, a lateral mower unit generally indicated 122, this unit being connected to the bracket by means of a ball and socket joint indicated at 80, see Figure 5.

In this way there are three mower units transversely aligned and all connected rearwardly of the tractor wheels by means entirely carried by the tractor. These units are so arranged with reference to the mowers 120 as to cut overlapping swaths and it is noticed that they may be quite closely spaced. Also, all of the mowers 120, 121 and 122 have their connecting means carried entirely by the tractor, with the important advantage that the tractor frame serves the function of a gang frame, and no independent gang frame or gang frame supporting wheels are required. In this manner, the tractive ability of the tractor is improved and much weight is eliminated, which is always of great importance in lawn mowing machinery. Referring to Figure 3: In trailing position the mowers 122 assume a position behind mowers 121 and 120 and none of these mowers extends a substantial distance beyond the outer sides of the rear tractor wheels. By removal of pins 66, the entire assemblies of mowers 122 and extension bars 68 may be dropped off for mowing with only three units.

Another feature of this invention is the provision of means partially carried by the tractor by which another pair of mowers can be disposed one on each side of the tractor, farther outwardly or laterally than the rear units, to increase the over-all width of the swath, and of course to cut overlapping swaths, with units 122. Another feature relates to the pivotal mounting of this last mentioned means on the bar 68 so that the whole system may be swung rearwardly and trailed, entirely within the width of the other mowers.

Referring first to Figures 1 and 5: The swing bar 68 has suitably secured thereto an upright tubular member 90 within which is rotatably socketed a pivot pin 91 suitably held against vertical movement by a split key. At the upper end of this pin is fastened a U-shaped bracket 92 having pivoted thereto by means of a horizontally arranged pin 93, a second U-shaped bracket carried by a bar 95 which may be called an outboard bar. This bar slants outwardly and forwardly, when in normal position for mowing operation, and is held in this position by means of a link 96 which has down-turned ends or hooks 97—98 respectively engaged with openings in brackets 99—100 respectively of the bar 95 and longitudinal chassis member 33. The bar 95 is also provided with another bracket 101 with an opening in which one of the hooks of link 96 is engaged when the bar 95 is in trailing position, see Figure 3. In trailing position the other hook is engaged with an opening of the draw bar of a mower unit, described below to secure the mower unit against swinging in a horizontal plane with respect to bar 95.

At the free end of each bar 95, see Figure 7, is pivotally secured the draw bar 107 of a mower unit generally indicated at 105. The unit draw bar is secured by means of a vertical bracket 106 which has a two piece ball socket formed at its lower end constructed to allow coupling or uncoupling of the ball associated therewith. The ball is carried by forward end of the draw bar 107 of the mower unit 105. This ball and socket joint is generally indicated at 108, and its function is like that of the ball joints previously described. In this case the mower draw bar is provided with a caster wheel 109 suitably pivoted on a vertical pivot 110 to a forwardly extending bracket 111 suitably attached to the forward end of the draw bar 107, forwardly of the ball joint.

The draw bar 107 of the mower unit 105 is provided with openings 117, one at each side of the draw bar at the front, see Figure 3. With one of these openings one hook of the link 96 is engaged to prevent horizontal swinging of the unit about its ball joint as a center. Each unit of the gang is provided with these openings 117 so that any unit when attached to either out-board bar 95 will leave an opening 117 which is properly positioned for connection with the hook of link 96.

When it is desired to bring the lateral units from mowing position (Figure 1) to trailing position (Figure 3) stop the tractor on unobstructed level ground, when going straight ahead. Operate the levers 50 to lift the units. Put the units out of gear. Remove the links 96 and insert one of the hooks in bracket 101. Swing bars 68 rearwardly and engage hooks of link 70 as shown in Figure 3. Then swing bars 95 outwardly and rearwardly, and arrange the links 96 as shown. Then drive straight ahead until the units swing in behind the tractor, after which any turn can be made to the right or left. It will be noted that on such turns the units 122 swing horizontally about ball joints 80, while the units 105, together with bars 95 and links 96 swing horizontally about pin and sleeve joints 91—90, and the units 121 and 120 swing about the ball joints of their respective draw bars. By removing the split keys from pins 91, the entire assemblies of bars 95 with mowers 105 may be dropped off for mowing with less than seven units.

I claim as my invention:

1. In combination with a vehicle, mower units which operate at points laterally of the vehicle wheels, means supported by the vehicle one for each unit and to which it is pivotally connected to swing in a horizontal plane, each of said means being separately and independently pivoted to the vehicle and being disposed to be swung in a horizontal plane from a lateral to a rearwardly extending direction and to such a position that the units do not extend a substantial distance laterally beyond the traction area of the vehicle wheels.

2. In combination with a vehicle, a bar pivoted by one end to and at a point behind the vehicle to swing in a horizontal plane from a point laterally of the vehicle to a point therebehind, a lawn mower pivoted to the bar to swing in a horizontal plane and means detachably connecting the bar with the vehicle to prevent rearward swinging of the bar.

3. In combination with a vehicle having a cross bar transversely arranged rearwardly of the vehicle wheels, a second bar swingably mounted on the cross bar to swing rearwardly of the cross bar, a lawn mower pivoted to the second bar to swing in a horizontal plane and means detachably connecting the second bar with the vehicle to prevent swinging of the bar.

4. In combination with a tractor, two bars pivotally supported by the tractor to extend in opposite directions laterally beyond the traction path of the tractor wheels or to swing to trailing position behind the tractor, a lawn mower operatively connected to each bar to swing in a horizontal plane, said tractor and each bar having means cooperative to secure the bar against rearward motion or to secure it in trailing position.

5. In combination with a tractor, a support carried by the tractor and arranged transversely and rearwardly of the rear tractor wheels, two bars each pivoted to the support to extend in opposite directions laterally beyond the traction path of the tractor wheels or to swing to trailing position behind said support, a lawn mower operatively connected to each bar to swing in a horizontal plane, said tractor and each bar having means cooperative to secure the bar against rearward motion or to secure it in trailing poistion.

6. In combination with a tractor including a steering mechanism controlling the front wheels, a plurality of mower units arranged between the front and rear wheels, and a bar transversely translatable on the tractor and operatively connected with said units, and means by which the steering mechanism shifts the bar laterally in either direction conformably to change in steering direction.

7. In combination with a tractor, a plurality of mower units operatively connected to the tractor and arranged thereabout to cut overlapping swaths, including two front units arranged between the front and rear wheels in the tractive path of the rear wheels, three rear units arranged rearwardly of the rear wheels one centrally and the others laterally, and two units arranged one on each side of the tractor laterally of all others, and intermediately of the front and rear units.

8. In combination with a tractor, a plurality of mower units arranged thereabout to cut overlapping swaths, including two front units arranged between the front and rear wheels in the tractive path of the rear wheels, three rear units arranged rearwardly of the rear wheels one centrally and the others laterally, and two units arranged one on each side of the tractor laterally of all others and intermediately of the front and rear units, and means entirely carried by the tractor for operatively supporting the units, each unit having means pivoting it to swing in a horizontal plane.

9. In combination with a tractor, a plurality of mower units operatively connected to the tractor and arranged thereabout to cut overlapping swaths, including two front units arranged between the front and rear wheels in the tractive path of the rear wheels, three rear units arranged rearwardly of the rear wheels one centrally and the others laterally, and two units arranged one on each side of the tractor laterally of all others and intermediately of the front and rear units, the transverse width of all units being substantially the same, and the units being closely spaced in a direction forwardly and rearwardly to the rear wheels of the tractor.

10. In combination with a tractor, a plurality of mower units arranged thereabout to cut overlapping swaths, including two front units arranged between the front and rear wheels in the tractor path of the rear wheels, three rear units arranged rearwardly of the rear wheels one centrally and the others laterally, and two units arranged one on each side of the tractor laterally of all others and intermediately of the front and rear units, means separately connecting each lateral unit to the tractor to permit the unit to be swung to a trailing position behind the tractor, and means for each connecting means acting to normally prevent swinging motion.

11. In combination with a tractor, a plurality of mower units arranged thereabout to cut overlapping swaths, including three units arranged rearwardly of the rear wheels one centrally and the others laterally, and two units arranged one on each side of the tractor laterally of all others, means separately connecting each lateral unit to the tractor to permit the unit to be swung to a trailing position behind the tractor.

12. In combination with a tractor, a first bar pivotally supported by the tractor rearwardly thereof at a point inwardly from the outer side of the traction path of the tractor wheels to extend laterally of the traction path of one tractor wheel, a mower unit pivoted to the bar, a second bar pivoted to the first bar, a mower unit pivoted to the second bar, all pivoted elements being swingable in a horizontal plane, means connecting the first bar to the tractor to hold it in laterally extended direction against pivotal motion, means connecting the second bar to the tractor in a manner to hold it in a forwardly laterally slanting position with reference to the tractor against pivotal motion, the bars when released being capable of being swung rearwardly to a point behind the tractor to be entrained and to in turn entrain respective mower units.

13. In combination with a tractor, a first bar arranged transversely and rearwardly of the rear tractor wheels, means rigidly detachably securing the bar to the tractor, second bars two in number pivoted to the first bar and extending laterally in opposite directions beyond the traction path of the tractor wheels, means securing each second bar against movement from its laterally extended position, and mowing units one pivoted to each second bar, two third bars one pivoted to each second bar and slanting forwardly and laterally of the tractor, a mowing unit pivoted to each third bar, all pivoted elements being swingable in a horizontal plane, and means for each second and third bar connecting the bar with the tractor to prevent swinging motion.

14. In combination with a tractor having rear drive wheels, a plurality of mower units each comprising a cutter and ground wheel for the operation thereof, said units being arranged to cut overlapping swaths, some of said units operating in the paths of and ahead of said drive wheels, and other of said units operating in a transverse row behind the axis of said drive wheels, each of said units being universally connected for lateral swinging to means carried on the tractor.

15. In combination with a tractor having rear drive wheels, a plurality of mower units each comprising a cutter and ground wheel for the operation thereof, said units being arranged to cut overlapping swaths, some of said units operating in a transverse row ahead of said drive wheels, and two other units operating in positions one at each side of said tractor and laterally beyond the traction path of the wheels, and other of said units operating in a transverse row behind the axis of said wheels, each of said units being universally connected for lateral swinging to means carried by the tractor.

16. In combination with a tractor, a multiplicity of mower units arranged to cut overlapping swaths, means carried on the tractor to connect several of said units, including laterally extending means pivoted on the tractor for vertical movement with respect thereto, and unit-connecting means on said extending means comprising a laterally swingable universal connection supported on a caster wheel.

17. A gang lawn mower comprising a multiplicity of mowing units arranged to cut overlapping swaths and connected to a unit spacing means, a unit spacing member pivoted at one end to said spacing means to swing horizontally, one of said units being pivoted to said spacing member to swing horizontally and detachable means retaining said spacing member and unit in transversely extended mowing position, said spacing member being adapted to allow the unit to swing in a horizontal plane backward behind other of said units for transporting in trailing position.

18. In combination with a vehicle of the automotive type, a pair of mowing units arranged to cut overlapping swaths at points laterally of and outwardly beyond the tractive path of the vehicle and means connecting said units to the vehicle for swinging from their lateral position to a position rearwardly of the vehicle, one behind the other and in longitudinal alignment with the direction of travel of the vehicle.

19. In combination with a vehicle, mower units which operate at points laterally of the vehicle, means one for each unit to which the unit is pivotally connected to swing in a horizontal plane, means connecting each of said means to the vehicle in such manner as to swing in a horizontal plane from a point laterally of the vehicle to a point rearwardly thereof, and in line with direction of the travel of the vehicle, and to such a position that the units do not extend a substantial distance laterally beyond the traction path of the vehicle wheels.

20. In combination with a vehicle, a bar pivotally supported by the vehicle rearwardly thereof to swing in a horizontal plane from a point laterally of the vehicle to a point rearwardly thereof and in line with the direction of travel of the vehicle, a lawn mower pivoted to the bar to swing in a horizontal plane, and means detachably connecting the bar with the vehicle to prevent rearward swinging of the bar, and means which holds said bar against swinging motion after it is moved to the aforesaid trailing position.

21. In a gang lawn mower comprising a multiplicity of mowing units arranged to cut overlapping swaths, spacing means for said units, a bar universally pivoted to said spacing means and adapted to swing from a laterally extending position to a position behind the spacing means, a laterally positioned unit of said gang pivoted to said bar to swing laterally, detachable means connecting said bar and said spacing means to hold the bar in laterally extending position while mowing, and detachable means for connecting said bar and unit to hold the center line of travel of the unit substantially parallel with the bar, whereby said bar and unit may be rendered free to swing laterally with respect to the spacing means, and whereby the said laterally positioned unit and bar will trail behind the spacing means when the latter is drawn forward.

22. In combination with an automotive vehicle having a steering mechanism, including front wheel, a plurality of mower units arranged rearwardly of the front wheels and a bar transversely translatable on a part of the tractor other than the steering mechanism and operatively connected with said units to permit said units to swing in a horizontal plane, and means by which the steering mechanism shifts the bar laterally in either direction conformably to movements of the steering mechanism.

23. In combination with a vehicle, of a lawn mower unit arranged at a point laterally of the vehicle, means connected with said vehicle retaining said unit in said lateral position for mowing operations and permitting it to accommodate itself to irregularities of the ground as the vehicle advances, and means permitting said unit to be swung in a substantially horizontal plane to a position in the rear of said vehicle.

24. In combination with a vehicle, of a plurality of independent lawn mower units arranged in overlapping mowing position laterally of said vehicle and means connected with said vehicle retaining said units in said lateral positions and permitting said units to accommodate themselves to inequalities of the ground as the vehicle is advanced, and means permitting said units to be swung in substantially horizontal planes to positions in the rear of said vehicles.

25. In combination with a vehicle, of a plurality of independent lawn mower units arranged in overlapping mowing positions laterally at each side of said vehicle, means connected with said vehicle retaining said units in said lateral positions on each side of said vehicle and permitting said units to individually accommodate themselves to inequalities of the ground as the vehicle is advanced, and means permitting the units on each side of said vehicle to be swung in substantially horizontal planes to positions in the rear of said vehicles.

26. In combination with a vehicle, of a plurality of independent lawn mower units arranged in overlapping mowing positions laterally at each side of said vehicle, means connected with said vehicle retaining said units in said lateral positions on each side of said vehicle and permitting said units to individually accommodate themselves to inequalities of the ground as the vehicle is advanced, and a plurality of other mower units arranged in overlapping positions and operatively connected for mowing operations between the above named two sets of laterally arranged mower units.

27. The combination with a motor driven vehicle having rearwardly arranged driving wheels, of a plurality of independent lawn mower units arranged in overlapping mowing position laterally at each side of said vehicle, means connected with said vehicle retaining said units in said lateral positions on each side of said vehicle and permitting said units to individually accommodate themselves to inequalities of the ground as the vehicle is advanced, and a plurality of other mower units arranged in overlapping positions and operatively connected for mowing operations between the above named two sets of laterally arranged mower units, two of the inwardly arranged units being positioned one in front of each of the vehicle driving wheels and another arranged centrally in the rear of the vehicle frame.

28. In combination, a rigid bar, a pair of transversely spaced wheels, means by which the bar is supported by the wheels transversely to their line of travel, an intermediate and two outside units placed rearwardly of the wheels and spaced transversely to the direction of travel to cut non-overlapping swaths, means separately connecting each unit to the bar for independent up and down motions conformably to ground contours and to permit each unit to swing in a horizontal plane, the inner end of one outside unit and one end of the intermediate unit being adjacent one wheel and the inner end of the other outside unit and the other end of the intermediate unit being adjacent the other wheel.

29. In combination, a rigid bar, a pair of transversely spaced wheels, means by which the bar is supported by the wheels transversely to their line of travel, an intermediate and two outside units placed rearwardly of the wheels and spaced transversely to the direction of travel to cut non-overlapping swaths, means separately connecting each unit to the bar for independent up and down motions conformably to ground contours and to permit each unit to swing in a horizontal plane, the inner end of one outside unit and one end of the intermediate unit being adjacent one wheel and the inner end of the other outside unit and the other end of the intermediate unit being adjacent the other wheel, and each outer unit including connecting means permitting it to be swung rearwardly to a trailing position in which it may cut an overlapping swath with the intermediate unit.

AMOS F. MOYER.